United States Patent
Kim et al.

(10) Patent No.: US 11,064,261 B2
(45) Date of Patent: Jul. 13, 2021

(54) ELECTRONIC DEVICE AND CONTROL METHOD THEREFOR

(71) Applicant: Samsung Electronics Co., Ltd., Suwon-si (KR)

(72) Inventors: Do-sung Kim, Hwaseong-si (KR); Sung-won Kim, Seongnam-si (KR); Mu-gong Bae, Suwon-si (KR); Hyun-don Yoon, Pohang-si (KR); Bong-seok Lee, Suwon-si (KR); Hee-ran Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/638,354

(22) PCT Filed: Sep. 21, 2018

(86) PCT No.: PCT/KR2018/011314
§ 371 (c)(1),
(2) Date: Feb. 11, 2020

(87) PCT Pub. No.: WO2019/066432
PCT Pub. Date: Apr. 4, 2019

(65) Prior Publication Data
US 2020/0169789 A1    May 28, 2020

(30) Foreign Application Priority Data
Sep. 26, 2017 (KR) .................. 10-2017-0124400

(51) Int. Cl.
*H04N 21/482* (2011.01)
*H04N 21/442* (2011.01)
(Continued)

(52) U.S. Cl.
CPC ... *H04N 21/4826* (2013.01); *H04N 21/44222* (2013.01); *H04N 21/4532* (2013.01);
(Continued)

(58) Field of Classification Search
CPC ......... H04N 21/44222; H04N 21/4532; H04N 21/4667; H04N 21/4668; H04N 21/8456; H04N 21/4826
See application file for complete search history.

(56) References Cited

U.S. PATENT DOCUMENTS 8,024,756 B2    9/2011    Friedlander et al.
9,143,717 B2    9/2015    Kim
(Continued)

FOREIGN PATENT DOCUMENTS

EP    3041250    7/2016
JP    2008-193431    8/2008
(Continued)

OTHER PUBLICATIONS

Extended European Search Report dated Sep. 30, 2020 from European Application No. 18862844.0, 6 pages.
(Continued)

*Primary Examiner* — Yassin Alata
(74) *Attorney, Agent, or Firm* — Staas & Halsey LLP

(57) ABSTRACT

A method for recommending a content by an electronic device is disclosed. The method for recommending a content by an electronic device includes the steps of recommending a content on the basis of a viewing history, calculating recommendation hit ratios of the recommended content according to days of the week and times of the day on the basis of the selection frequency of the recommended content, and storing the same, and based on a specific event occurring, calculating a recommendation hit ratio of a content corresponding to the day and time when the specific
(Continued)

event occurred, and based on the calculated recommendation hit ratio satisfying a predetermined condition, directly providing the content.

13 Claims, 11 Drawing Sheets

(51) Int. Cl.
H04N 21/45 (2011.01)
H04N 21/466 (2011.01)
H04N 21/845 (2011.01)

(52) U.S. Cl.
CPC ..... *H04N 21/4667* (2013.01); *H04N 21/4668* (2013.01); *H04N 21/8456* (2013.01)

(56) References Cited

U.S. PATENT DOCUMENTS

| | | | |
|---|---|---|---|
| 10,097,895 | B2 | 10/2018 | Han et al. |
| 10,123,064 | B2 | 11/2018 | Chae et al. |
| 2004/0003395 | A1* | 1/2004 | Srinivas ............. H04N 21/4826 725/34 |
| 2007/0146331 | A1 | 6/2007 | Kim |
| 2010/0251305 | A1* | 9/2010 | Kimble .............. H04N 21/4668 725/46 |
| 2012/0151511 | A1 | 7/2012 | Bernard et al. |
| 2014/0337412 | A1 | 11/2014 | Chae et al. |
| 2016/0274744 | A1* | 9/2016 | Neumann ........ H04N 21/47202 |

FOREIGN PATENT DOCUMENTS

| | | |
|---|---|---|
| JP | 2011-146766 | 7/2011 |
| JP | 2012-23636 | 2/2012 |
| JP | 2017-167906 | 9/2017 |
| KR | 2000-0051975 | 8/2000 |
| KR | 10-2007-0069613 | 7/2007 |
| KR | 10-2008-0029088 | 4/2008 |
| KR | 10-2008-0058637 | 6/2008 |
| KR | 10-2012-0064612 | 6/2012 |
| KR | 10-2014-0132658 | 11/2014 |
| KR | 10-2015-0042584 | 4/2015 |

OTHER PUBLICATIONS

International Search Report dated Jan. 18, 2019 from International Patent Application No. PCT/KR2018/011314.
Written Opinion of the International Searching Authority dated Jan. 18, 2019 from International Patent Application No. PCT/KR2018/011314, 13 pages.

* cited by examiner

FIG. 5

| Time<br>Day | 1 | ... | | 17 | 18 | 19 | 20 | 21 | 22 | 23 | 24 |
|---|---|---|---|---|---|---|---|---|---|---|---|
| 2017-07-24 (Mon) | | | | | | | | | | Golf | |
| 2017-07-25 (Tue) | | | | CB# | | | ESP# | ESP# | | | |
| 2017-07-26 (Wed) | | | | CB# | | | ESP# | | | | |
| 2017-07-27 (Thur) | | | | CB# | | | TN# | | | | |
| 2017-07-28 (Fri) | | | | | | | TN# | | | | |
| 2017-07-29 (Sat) | | | | | | | ESP# | | CB# | | |
| 2017-07-30 (Sun) | | | | | ESP# | | FO# | | | | |

FIG. 6

| Prediction #1 | Prediction #2 | Prediction #3 | Prediction #4 | Prediction #5 | Prediction #6 |
|---|---|---|---|---|---|
| Ch 5: 200min | Ch 3: 100min | Ch 24: 80min | Ch 51: 60min | Ch 9: 40min | Ch 11: 20min |

ELECTRONIC DEVICE AND CONTROL METHOD THEREFOR

CROSS REFERENCE TO RELATED APPLICATIONS

This application is a National Phase application, under U.S.C. § 371, of International Application No. PCT/KR2018/011314 filed Sep. 21, 2018, which claims priority to Korean Patent Application No. 10-2017-0124400, filed Sep. 26, 2017, the entire disclosures of which are herein incorporated by reference as a part of this application.

TECHNICAL FIELD

The disclosure relates to an electronic device and a control method therefor, and more particularly, to an electronic device which can provide information on service recommendation on the basis of a device use history, and a control method therefor.

BACKGROUND ART

As conventional methods for recommending contents (services) to a user, there were a method of outputting a list for a history of frequent use, or a method of outputting a recent viewing history.

In addition, there were a method of recommending a service at a specific time by using a function such as a bookmark set by a user or a reservation system, etc.

In such methods, a user had to select a specific menu (e.g., a history service). However, as general users think that a method of using a specific menu is complex, a history service was not used widely.

For example, if a user wanted to select a sport channel that he frequently viewed at a specific time, he chose the desired channel by searching the channel while keeping changing channels, or getting into the full program schedule, etc.

Meanwhile, a user could set a channel that he frequently viewed as a bookmarked channel, or a reserved channel. However, a plurality of setting operations were needed for this through a menu, and thus use frequency of this was not high.

DETAILED DESCRIPTION OF THE INVENTION

Technical Problem

The disclosure was devised for improving the aforementioned problem, and the purpose of the disclosure is in providing an electronic device which can provide information on service recommendation in case there is a specific action of a user on the basis of a device use history by utilizing minimum resources, and a control method therefor.

Technical Solution

A method for recommending a content by an electronic device according to an embodiment of the disclosure for achieving the aforementioned purpose includes the steps of recommending a content on the basis of a viewing history, calculating recommendation hit ratios of the recommended content according to days of the week and times of the day on the basis of the selection frequency of the recommended content, and storing the same, and based on a specific event occurring, calculating a recommendation hit ratio of a content corresponding to the day and time when the specific event occurred, and based on the calculated recommendation hit ratio satisfying a predetermined condition, directly providing the content that satisfies the predetermined condition.

In this case, the predetermined condition means a case wherein the recommendation hit ratio is higher than a threshold value, and the method for recommending a content by an electronic device may further include the step of, based on the recommendation hit ratio being lower than a threshold value, providing a menu which enables selection of a content corresponding to the day and time when the specific event occurred.

Also, the method for recommending a content by an electronic device may further include the step of, based on cancellation of the menu being repeated greater than or equal to a threshold number of times, inactivating a content recommendation function.

In this case, the method for recommending a content by an electronic device may further include the step of, based on viewing of the content directly provided as the recommendation hit ratio is higher than a threshold value being cancelled greater than or equal to a threshold number of times, inactivating a content recommendation function.

In this case, the specific event may be an event wherein the number of times of changing broadcast channels during a predetermined time period exceeds a threshold number of times.

Also, the specific event may be an event wherein a tuned state of a broadcast channel is maintained exceeding a predetermined time period.

In addition, the specific event may be an event wherein a viewing starting time or a viewing finishing time predicted on the basis of the viewing history comes.

Meanwhile, the step of recommending a content on the basis of a viewing history may include the steps of applying a first weight to the day of viewing a content provided at the electronic device earlier, and applying a second weight to the time of viewing, and recommending a content based on a result of combination of the first weight and the second weight.

Also, in the step of calculating hit ratios and storing the same, cases wherein a user actually views the recommended content may be counted, and a ratio between counted contents may be stored as a hit ratio in a memory.

Meanwhile, an electronic device according to an embodiment of the disclosure includes a display, a memory storing a viewing history, and a processor configured to recommend a content on the basis of the viewing history, and calculate recommendation hit ratios of the recommended content according to days of the week and times of the day on the basis of the selection frequency of the recommended content, and store the same in the memory. The processor, based on a specific event occurring, calculates a recommendation hit ratio of a content corresponding to the day and time when the specific event occurred, and based on the calculated recommendation hit ratio satisfying a predetermined condition, directly provides the content that satisfies the predetermined condition.

In this case, the predetermined condition means a case wherein the recommendation hit ratio is higher than a threshold value, and the processor may, based on the recommendation hit ratio being lower than a threshold value, control the display to provide a menu which enables selection of a content corresponding to the day and time when the specific event occurred.

In this case, the processor may, based on cancellation of the menu being repeated greater than or equal to a threshold number of times, inactivate a content recommendation function.

Also, the processor may, based on viewing of the content directly provided as the recommendation hit ratio is higher than a threshold value being cancelled greater than or equal to a threshold number of times, inactivate a content recommendation function.

Meanwhile, the specific event may be an event wherein the number of times of changing broadcast channels during a predetermined time period exceeds a threshold number of times.

Also, the specific event may be an event wherein a tuned state of a broadcast channel is maintained exceeding a predetermined time period.

In addition, the specific event may be an event wherein a viewing starting time or a viewing finishing time predicted on the basis of the viewing history comes.

In this case, the processor may apply a first weight to the day of viewing a content provided at the electronic device earlier, and apply a second weight to the time of viewing, and recommend a content based on a result of combination of the first weight and the second weight.

Also, the processor may count cases wherein a user actually views the recommended content, and store a ratio between counted contents as a hit ratio in a memory.

Meanwhile, in a computer readable recording medium including a program for executing a method for recommending a content by an electronic device according to an embodiment of the disclosure, the recommendation method includes the steps of recommending a content on the basis of a viewing history, calculating recommendation hit ratios of the recommended content according to days of the week and times of the day on the basis of the selection frequency of the recommended content, and storing the same, and based on a specific event occurring, calculating a recommendation hit ratio of a content corresponding to the day and time when the specific event occurred, and based on the calculated recommendation hit ratio satisfying a predetermined condition, directly providing the content that satisfies the predetermined condition.

BRIEF DESCRIPTION OF DRAWINGS

FIG. 5 is a diagram for illustrating various embodiments of the disclosure of selecting a recommended content based on history information;

FIG. 6 is a diagram for illustrating a method for calculating a recommendation hit ratio based on a recommended content;

BEST MODE FOR IMPLEMENTING THE DISCLOSURE

Figure 1:
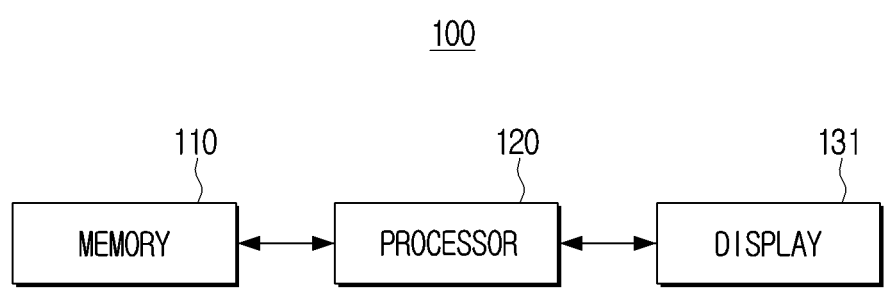
FIG. 1 is a block diagram for illustrating a configuration of an electronic device according to an embodiment of the disclosure.

Before describing the disclosure in detail, the description method of this specification and the drawings will be described.

First, as terms used in this specification and the claims, general terms were selected in consideration of the functions described in various embodiments of the disclosure. However, the terms may vary depending on the intention of those skilled in the art, legal or technical interpretation, or emergence of new technologies. Also, in some cases, there are terms that were arbitrarily designated by the applicant, and the meaning of such terms may be interpreted as defined in this specification, and if there is no specific definition of the terms, the terms may be interpreted based on the overall content of this specification and general technical knowledge in the art.

Also, the same reference numerals or symbols described in each drawing accompanying this specification indicate parts or components that perform substantially the same functions. For the convenience of explanation and understanding, the parts or components will be described by using the same reference numerals or symbols in different embodiments. That is, even if a plurality of drawings all illustrate components having the same reference numerals, the plurality of drawings do not refer to one embodiment.

In addition, in this specification and the claims, terms including ordinal numbers such as "the first" and "the second" may be used for distinguishing components. Such ordinal numbers are used for distinguishing the same or similar components from one another, and it is not intended that the meaning of terms is restrictively interpreted due to use of such ordinal numbers. As an example, the order of use or the order of arrangement, etc. of a component combined with such ordinal numbers should not be restricted by the numbers. Depending on needs, each ordinal number may be used while being replaced with each other.

In this specification, singular expressions include plural expressions, unless defined obviously differently in the context. Further, in the disclosure, terms such as "include" and "consist of" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof.

In the embodiments of the disclosure, terms such as "a module," "a unit" and "a part" are for referring to elements performing at least one function or operation, and these elements may be implemented as hardware or software, or as a combination of hardware and software. Further, a plurality of "modules," "units," "parts" and the like may be integrated into at least one module or chip and implemented as at least one processor, except when each of them has to be implemented as individual, specific hardware.

Also, in the embodiments of the disclosure, the description that a part is connected with another part not only includes a case of direct connection, but also includes a case of indirect connection through another medium. Further, the description that a part includes an element means that another element may be further included, but not that another element is excluded, unless there is a particular opposing description.

In addition, in the embodiments of the disclosure, the meaning of recommending a content may include the step of selecting a content on the basis of a viewing history stored in a memory and calculating history information and recommendation hit ratios in this regard. Also, it may mean converting to a content directly or displaying a menu inquiring whether to perform conversion. In this case, the meaning of 'specific,' threshold,' or 'any' may mean a predetermined value.

FIG. 1 is a block diagram for illustrating a configuration of an electronic device according to an embodiment of the disclosure.

Referring to FIG. 1, the electronic device 100 may include a memory 110, a processor 120, and a display 131.

The electronic device 100 may be implemented as various devices such as a computer, a TV, a set-top box, a smartphone, and a smart watch. For example, the electronic device 100 may be implemented as an analog TV, a digital TV, a 3D-TV, a smart TV, an LED TV, an OLED TV, a plasma TV, a monitor, a curved TV having a screen of a fixed curvature, a flexible TV having a screen of a fixed curvature, a bended TV having a screen of a fixed curvature, and/or a curvature variable TV wherein the curvature of the current screen can be changed by a received user input, etc., but is not limited thereto.

The electronic device 100 may receive input of a voice through an internal microphone 150 or a microphone installed inside an external device and perform voice recognition directly, or transmit an input voice to an external server performing voice recognition and receive a result of voice recognition.

In case the electronic device 100 performs voice recognition directly, an artificial intelligence system for recognizing voices may be provided on it. An artificial intelligence system is a computer system implementing intelligence of a human level and is a system wherein a machine learns and determines by itself, and which shows a more improved recognition rate as it is used more. An artificial intelligence system may recognize an input voice through a linguistic understanding technology of recognizing human languages/characters among artificial intelligence technologies. Linguistic understanding is a technology of recognizing human languages/characters, and applying/processing them, and includes natural speech processing, machine translation, communication systems, queries and answers, voice recognition/synthesis, and the like.

According to another embodiment of the disclosure, a separate external device having a microphone stored therein exists, and the external device may perform a voice recognition process for an input voice and provide a result of voice recognition to the electronic device 100.

The electronic device 100 may be controlled based on the result of voice recognition. For example, if the result of voice recognition includes "Recommend me a channel," the electronic device 100 may select a recommended channel and provide information on the selected recommended channel through an outputter 130.

The memory 110 stores information on the use history of the electronic device 100. Main information stored includes the ON/OFF time of the electronic device 100, the viewing history (channels, titles, additional information of programs, etc.), the execution history of apps, the input history such as input of a remote control and input of a voice, the use history of functions (a menu, etc.), and the like, and information on the time points of use is also stored. The information stored may be deleted after a specific time period passes.

Also, in the memory 110, weights W1, W2, W3 to be added to a history are stored. To a weight, a use pattern that continuously changes is reflected, and the weight may be periodically updated. Also, in order that a weight can be updated for every predetermined cycle, a task of checking in this regard periodically may be repeated. Specifically, when a periodic update schedule comes, the processor 120 may perform a query to the server 200 and update a weight.

The memory 110 may store various kinds of application programs, data, and software modules for operating and controlling the electronic device 100 by control of the processor 120. For example, the memory 110 may include a history storing/analyzing module storing a use history of a service provided by the electronic device 100, a curator module selecting a recommended service, a service exposing module providing information on the selected recommended service, a voice recognition module, an image recognition module, etc.

Also, in the memory 110, information on a history that a user used the electronic device 100 may be stored. The history information may include, for example, the device ON/OFF time of the electronic device 100, the use history of contents, input information (a remote control, a voice, etc.), a use history of functions (a history of selecting a menu, etc.), and the like. Also, the memory 110 may store history information according to days of the week and times of the day for each of the at least one content provided at the electronic device 100. The memory 110 may store only history information according to days, or store only history information according to times. Specifically, history information may include information on when (the date and the time) a specific content was used, and how long (the time of use) the content was used. To the history information, a new history may be added as a user uses a content, and the history information may be updated.

Here, a content may be, for example, a broadcast channel, a broadcast content (e.g., a VoD, a streaming content (an image, music, etc.)), or a plurality of applications, functions, etc. that can be executed at the electronic device 100. That is, history information may include, for example, information on when a specific broadcast channel was viewed, and how long the channel was viewed, and may include information on when a specific application was used, and how long the application was used, and may include information on when a specific content was reproduced, and how long the content was reproduced. However, the disclosure is not limited to the aforementioned embodiment, and various history information may be stored in the memory 110 according to which content the electronic device 100 provides.

The memory 110 may be implemented as a non-volatile memory, a volatile memory, a flash-memory, a hard disk drive (HDD), or a solid state drive (SSD), etc. Meanwhile, the memory 110 may be implemented not only as a storage medium inside the electronic device 100, but also as an external storage medium, e.g., a micro SD card, a USB memory, or a Web server through a network, etc.

The processor 120 controls the overall operations of the electronic device 100.

Specifically, the processor 120 may recommend a content on the basis of a viewing history, and calculate recommendation hit ratios of the recommended content according to days of the week and times of the day on the basis of the selection frequency of the recommended content, and store the same in the memory 110. In this case, the operation of recommending a content means an operation of searching a content corresponding to the day and time like selecting a content and determining a content appropriate for a user, and may be used as a meaning of selecting a content. Meanwhile, a method for calculating a recommendation hit ratio will be described later with reference to FIG. 9.

Also, in case a specific event occurred, the processor 120 may calculate a recommendation hit ratio of a content corresponding to the day and time when the specific event occurred, and if the calculated recommendation hit ratio satisfies a predetermined condition, the processor 120 may directly provide the content that satisfies the predetermined condition.

In this case, the predetermined condition means a case wherein the recommendation hit ratio is higher than a threshold value, and if the recommendation hit ratio is lower than a threshold value, the processor 120 may control the display 131 to provide a menu which enables selection of a content corresponding to the day and time when the specific event occurred.

Meanwhile, there may be a plurality of contents corresponding to the day and time when a specific event occurred. In this case, if the recommendation hit ratio of a content corresponding to the day and time when the event occurred is higher than a threshold value, the processor 120 may control the display 131 to directly display a content of which recommendation hit ratio is the maximum among a plurality of contents of which recommendation hit ratios are higher than a threshold value, and if the recommendation hit ratio of a content corresponding to the day and time when the event occurred is lower than a threshold value, the processor 120 may control the display 131 to display a plurality of recommended contents when the event occurred, and display a menu which enables selection of one among the plurality of contents.

If a specific event occurs, the processor 120 may provide information on a content that a user is highly likely to use at the time point when the event occurs based on history information stored in the memory 110 to the user. Also, the processor 120 may provide recommendation information for the content by using an artificial intelligence technology. An artificial intelligence technology consists of a machine learning (deep learning) technology using an algorithm which classifies/learns the characteristics of input data by itself, and element technologies of simulating functions of a human brain such as cognition and determination by using a machine learning algorithm. Recommendation information for a content may be provided by using an inference/prediction technology of determining information and making logical inference and prediction among artificial intelligence technologies. Inference/prediction is a technology of determining information and making logical inference and prediction, and may include knowledge/probability based inference, optimization prediction, preference based planning, recommendation, and the like.

According to an embodiment of the disclosure, in case a specific event occurred, the processor 120 may add a weight to a history corresponding to at least one of the day or time when the event occurred, and select a recommended content among a plurality of contents based on the history that the weight was added. Here, a history indicates at least one of the number of times of using contents included in the history information or the time of using the contents.

Here, a specific event may be one of an event wherein the number of times of changing broadcast channels during a predetermined time period exceeds a threshold number of times, an event wherein a tuned state of a broadcast channel is maintained exceeding a predetermined time period, or an event wherein a predicted viewing starting time or viewing finishing time comes on the basis of the viewing history.

Also, a specific event may be, for example, an event wherein a user selects a specific button of a remote control device controlling the electronic device 100, and a control signal corresponding thereto is received at the electronic device 100. As another example, the electronic device 100 may receive a voice command, and a specific event may be an event wherein a user utters a specific voice, for example, "Recommend me a channel," and the voice command is received at the electronic device 100. As another example, a specific event may be an event wherein the electronic device 100 is turned on. As another example, a specific event may be an event wherein a recommendation menu displayed on the touch screen of the electronic device 100 is selected. As another example, a specific event may be an event wherein a predetermined time comes. As another example, a specific event may be an event wherein history information stored in the memory 110 is updated. However, the disclosure is not limited to the aforementioned examples, and any case wherein recommendation of a content is required may be set as a specific event.

In case a specific event occurred, the processor 120 may add a first weight W1 to a history corresponding to the time when the specific event occurred, and add a second weight W2 to a history corresponding to the day when the specific event occurred, and add a third weight W3 to a history corresponding to a day and a time different from the day and the time when the specific event occurred, and calculate use indices for each of a plurality of contents. Then, the processor 120 may select a recommended content based on the order of having higher use indices. Here, the first weight, the second weight, and the third weight may be values different from one another, and the sizes of the values may be bigger in the order of the first weight, the second weight, and the third weight. Also, the third weight may be set as "1" which is a default value.

Meanwhile, as described above, respective weights may be added to all of a history corresponding to the time when the specific event occurred, a history corresponding to the day when the specific event occurred, and a history corresponding to a day and a time different from the day and the time when the specific event occurred. However, it is also possible that weights are added to only one or two of the three, and use indices are calculated.

The processor 120 may apply the first weight to the day of viewing a content provided at the electronic device earlier, and apply the second weight to the viewing time, and recommend a content based on a result of combination of the first weight and the second weight. Also, the processor 120 may count cases wherein a user actually views the recommended content, and store a ratio between counted contents as a hit ratio in the memory 110.

In addition, the processor 120 may count the number of times that a user cancels a recommendation function, and determine whether the number of times is greater than a threshold number of times. Specifically, if cancellation of a menu is repeated greater than or equal to a threshold number of times, the processor 120 may inactivate a content recommendation function, and if a recommendation hit ratio is higher than a threshold value and viewing of a content directly provided is cancelled greater than or equal to a threshold number of times, the processor 120 may inactivate a content recommendation function. The aforementioned function falls under an operation of reflecting a habit of not using a content even though the processor 120 provides a content automatically recommended. If a user showed an operation of not using a recommendation function greater than or equal to a threshold number of times and cancelling the function directly, the processor 120 may reflect this and may not provide a recommendation function anymore.

In this case, the cancelling operation may be a user's behavior of changing to the original channel again even though the processor 120 performed an operation of converting (moving) to a recommended content directly. Also, the cancelling operation may mean an operation wherein, even though a menu for a recommended content is displayed, a user clicks a close or cancellation button and does not use a content recommendation function. By analyzing such a user pattern, the processor 120 may not provide a recommendation function at a specific time or on a specific day, and may automatically change the setting so that a recommendation function is not provided anymore.

The processor 120 may recognize an image displayed on the display 131 and determine a service currently used, and generate history information based on the determination result. For example, in the processor 120, an artificial intelligence system for image recognition may be provided. An artificial intelligence system is a computer system implementing intelligence of a human level and is a system wherein a machine learns and determines by itself, and which shows a more improved recognition rate as it is used more. An image may be recognized through a visual understanding technology of recognizing an object in a similar manner to human vision among artificial intelligence technologies. Visual understanding is a technology of recognizing an object in a similar manner to human vision, and processing the object, and includes recognition of an object, tracking of an object, search of an image, recognition of humans, understanding of a scene, understanding of a space, improvement of an image, and the like.

The processor 120 performs an operation of controlling the overall operations of the electronic device 100 and flow of signals among internal components of the electronic device 100, and processing data.

The processor 120 includes a RAM 121, a ROM 122, a CPU 123, and a bus 124. The RAM 121, the ROM 122, and the CPU 123 may be connected with one another through the bus 124. Meanwhile, the processor 120 may be implemented as a system on chip (SoC).

The CPU 123 accesses the memory 110, and performs booting by using an O/S stored in the memory 110. Then, the CPU 123 performs various operations by using various kinds of programs, contents, data, etc. stored in the memory 110. Also, the CPU 123 may perform the operation of the processor 120 explained with reference to FIG. 1.

When booting of the display device 100 is completed, the GPU 124 may generate a screen including various objects such as icons, images, and texts. Such a GPU may be constituted as a separate component such as an image processor 160, and may be implemented as a component such as an SoC combined with a CPU inside the processor 120.

The ROM 122 stores a set of instructions for system booting, etc. When a turn-on instruction is input and power is supplied, the CPU 123 copies the O/S stored in the memory 110 in the RAM 121 according to the instruction stored in the ROM 122, and boots the system by executing the O/S. When booting is completed, the CPU 123 copies various kinds of application programs stored in the memory 110 in the RAM 121, and performs various operations by executing the application programs copied in the RAM 121. The processor 120 may perform various operations by using a module stored in the memory 110.

The display 131 may display an image such that a user can see a recommended content provided by the processor 120. Also, the display 131 may additionally display a UI element to a user while displaying an image. In this case, the UI element may be a phrase requesting selection to the user, or a menu displaying a plurality of recommended contents. Also, the UI element may be an interface that can be recognized separately from contents, without being limited to a specific content.

The display 131 may be implemented as a liquid crystal display (LCD), a plasma display panel (PDP), organic light emitting diodes (OLEDs), etc., and it may also be implemented as a touch screen.

The electronic device 100 according to an embodiment of the disclosure may calculate a history index by adding a weight according to a day and a time in a viewing history or may additionally calculate a recommendation hit ratio. Determination according to a day and a time is based on the feature that a user's content consumption pattern is repeated by a unit of a week, and this may be one month or one day, but not one week, according to a user's habit. If different weights are added according to days and times, a content that a user consumes on a specific day at a specific time can be analyzed precisely, and weights may be adjusted appropriately for a user.

Also, if a reduction value is used, a content can be recommended mainly based on contents that a user recently consumed, and thus a user's changing consumption pattern can be reflected.

In addition, through a process of calculating a recommendation hit ratio, the electronic device 100 may identify whether a recommended content is appropriate for a user, and may change values that a user can set in advance such as a weight and a threshold value by reflecting this. Through the operation of changing a weight, a threshold value, etc., a content that is more appropriate for a user can be recommended.

Also, the electronic device 100 according to an embodiment of the disclosure may analyze a user's pattern that did not use a recommendation function. By reflecting a user's intention by counting the number of times of not using a recommendation function, a consumer's satisfaction can be heightened.

In addition, as the processor 120 performs an operation of converting (displaying) a content directly under a specific condition, etc., a user can access a content that he wishes to view easily, without a separate access to a menu.

Figure 2:
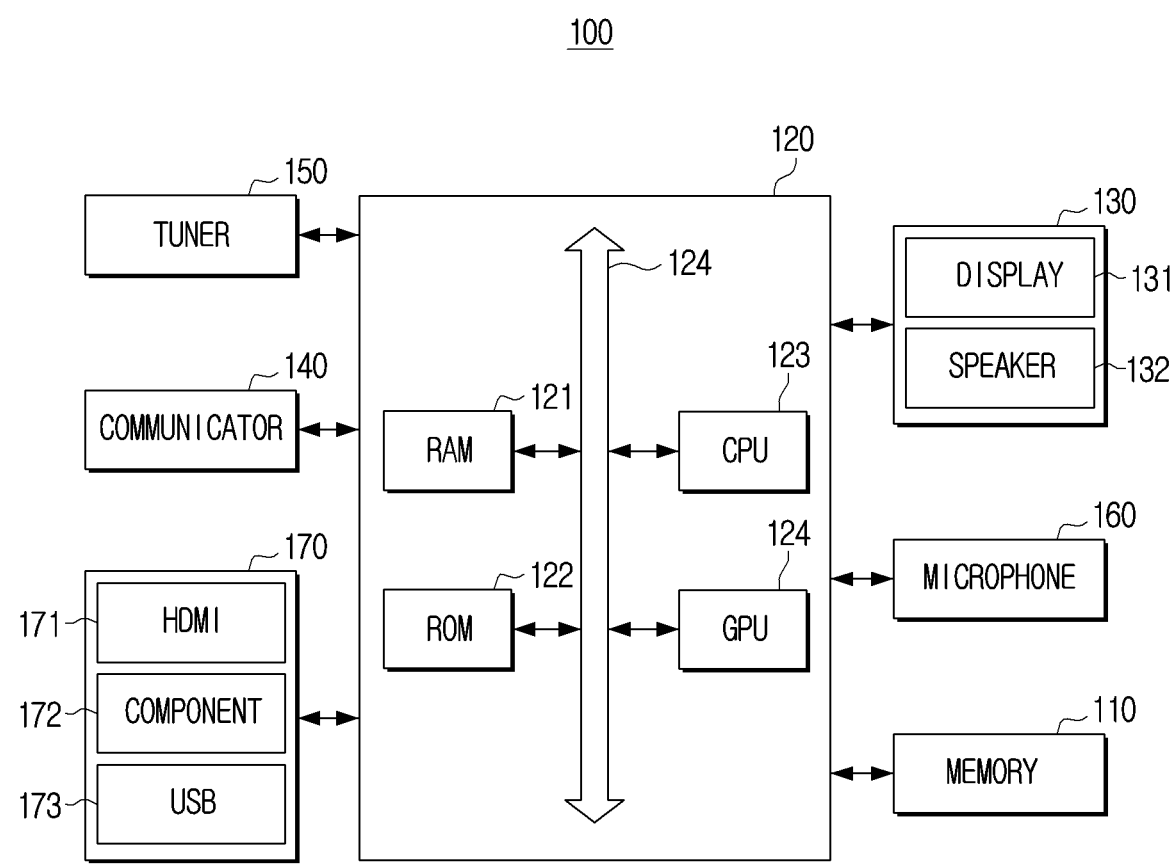
FIG. 2 is a block diagram for illustrating a configuration of an electronic device according to another embodiment of the disclosure.

So far, only brief description of the components of the electronic device 100 was made, but the electronic device 100 may additionally include components as illustrated in FIG. 2. Detailed description of the components of the electronic device 100 will be made below with reference to FIG. 2.

FIG. 2 is a block diagram for illustrating the configuration of the electronic device 100 according to another embodiment of the disclosure.

Referring to FIG. 2, the electronic device 100 may include a memory 110, a processor 120, an outputter 130, a display 131, a communicator 140, a tuner 150, a microphone 160, and a port part 170.

Meanwhile, as description regarding operations of the memory 110, the processor 120, and the display 131 was made with reference to FIG. 1 above, overlapping description will be omitted.

The outputter 130 may include a display 131 for outputting images, and a speaker 132 for outputting audio.

The speaker 132 is a component outputting audio. The speaker 132 is an acoustic device that changes an electronic signal into vibration of a vibration plate and generates a dilatational wave in the air, and thereby copies a sound wave, and it may output voice data.

The communicator 140 is a component performing communication with various types of external devices according to various types of communication methods. The communicator 140 may be connected to an external device through a local area network (LAN) or an Internet network, or it may be connected with an external device by a wireless communication method (e.g., wireless communication such as Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, GSM, UMTS, LTE, WiBRO, and the like). Also, the communicator 140 may include various communication chips such as a Wi-Fi chip, a Bluetooth chip, an NFC chip, a wireless communication chip, and the like. A Wi-Fi chip, a Bluetooth chip, and an NFC chip respectively perform communication by a Wi-Fi method, a Bluetooth method, and an NFC method. A wireless communication chip means a chip that performs communication according to various communication standards such as IEEE, Zigbee, 3rd Generation (3G), 3rd Generation Partnership Project (3GPP), Long Term Evolution (LTE), and the like. Also, the communicator 140 may include a light receiver that can receive a control signal (e.g., an IR pulse) from an external device. Through the communicator 140, a user command input from an external device may be received, and information on a selected recommended service may be transmitted to an external user terminal through the communicator 140, and data may be transmitted and received with a server 200 through the communicator 140.

The tuner 150 may receive video, audio, and data in a frequency band corresponding to a channel number corresponding to a user input.

The tuner 150 may receive broadcast signals from various sources such as ground wave broadcasting, cable broadcasting, or satellite broadcasting. Also, the tuner 150 may receive broadcast signals from sources such as analog broadcasting or digital broadcasting among various sources.

The tuner 150 may be implemented as an all-in-one type with the electronic device 100 or as a separate device having a tuner unit that is electronically connected with the electronic device 100 (e.g., a set-top box, a tuner connected to the port part 170).

The tuner 150 may tune only the frequency of the channel to be received at the electronic device 100 among numerous electric wave components through amplification, mixing, resonance, etc. of a broadcast signal received by wire or wirelessly, and select the frequency. A broadcast signal may include video, audio, and additional data (e.g., an electronic program guide (EPG)).

The port part 170 is a component for being connected with an external device. The port part 170 may include at least one of a high-definition multimedia interface (HDMI) input port 171, a component input jack 172, or a USB port 173. In addition to the components illustrated, the port part 170 may include at least one of ports such as an RGB, a DVI, an HDMI, a DP, and a thunderbolt. It is possible that information on a recommended service is transmitted to an external device through the port part 170.

Figure 3:
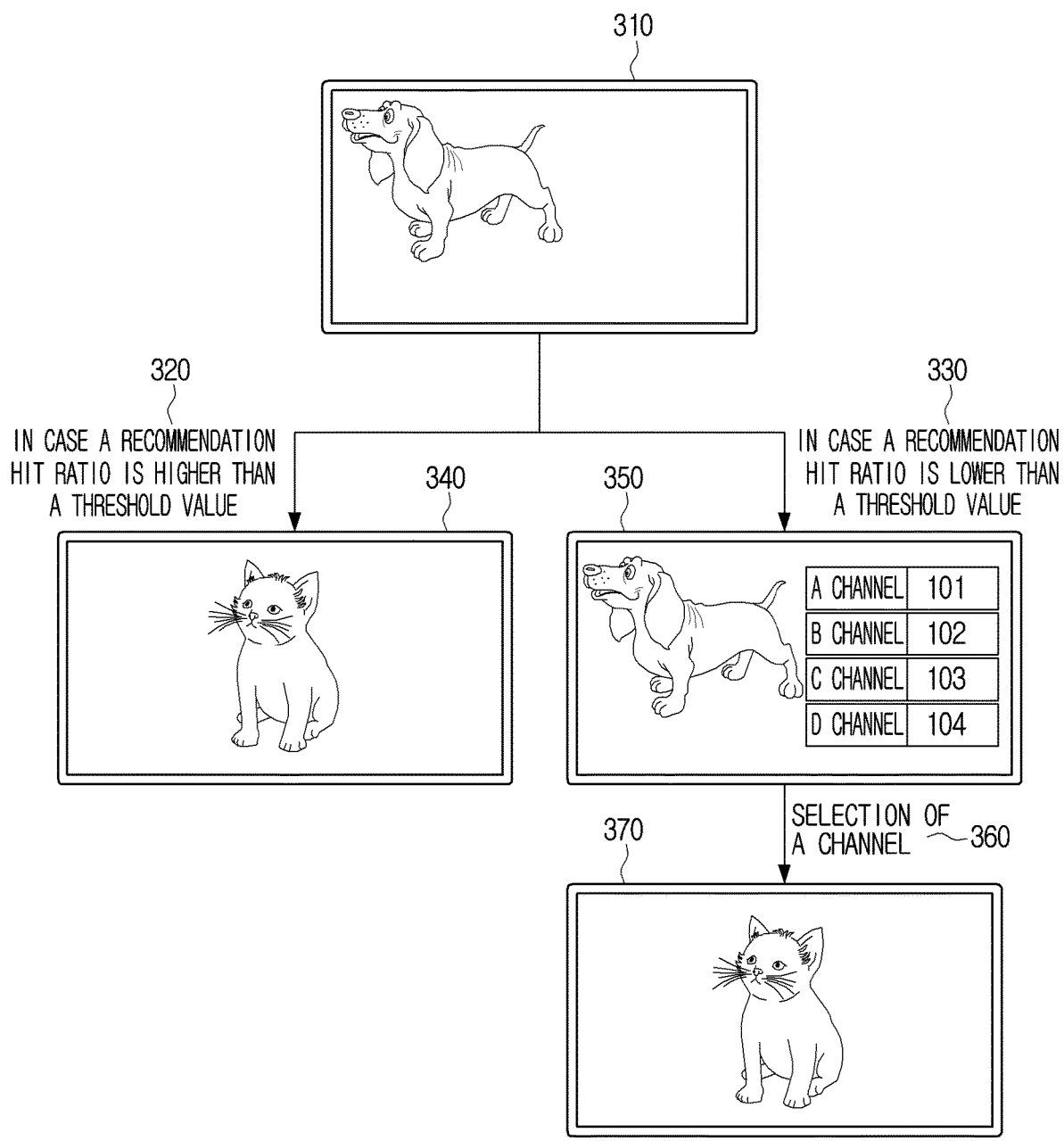
FIG. 3 is a diagram for illustrating a method for providing a recommended content according to an embodiment of the disclosure.
Figure 4:
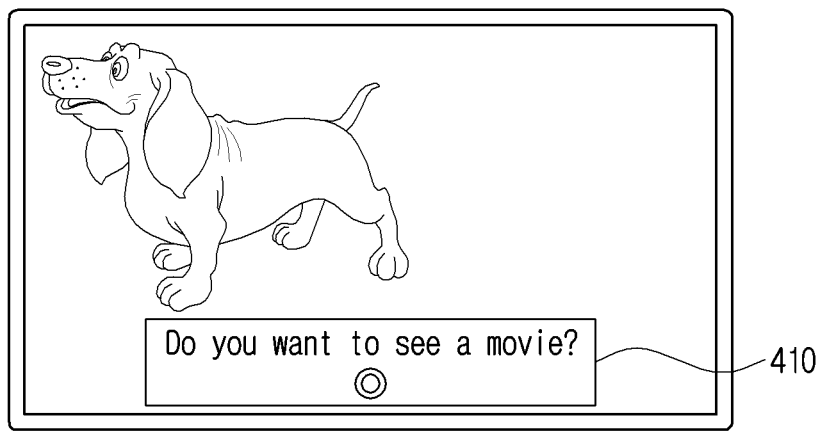
FIG. 4 is a diagram for illustrating a method for providing a recommended content according to an embodiment of the disclosure.

FIGS. 3 and 4 are diagrams for illustrating a method for providing a recommended content according to an embodiment of the disclosure.

FIG. 3 is a diagram for illustrating that a screen displayed on the display 131 varies according to a recommendation hit ratio.

Referring to FIG. 3, a case wherein a channel is displayed in a general way can be assumed 310. In this case, if a specific event occurs, the processor 120 may recommend a content. Here, there may be a plurality of recommended contents. If recommendation hit ratios are calculated in a plurality of recommended contents, it may be determined regarding each recommended content whether it has a recommendation hit ratio higher than a threshold value. In this case, if a recommended content has a recommendation hit ratio higher than a threshold value 320, the processor 120 may directly display the recommended content on the display 131. If there are a plurality of contents having recommendation hit ratios higher than a threshold value, the processor 120 may directly display the content having the highest recommendation hit ratio.

Meanwhile, in case the recommendation hit ratio of a recommended content is lower than a threshold value 330, the processor 120 may display a menu selecting a recommended content within a range of not interfering with the currently displayed content 350. The part wherein the menu is displayed may be a specific edge or lower end of the display 131. However, if the menu selecting a recommended content does not interfere with the previously viewed screen, the location may be another specific location. Also, for each recommended content, at least one content of the channel number or the channel name may be displayed, or the types of programs currently broadcasted such as dramas, sports, entertainment, and the like may be added and displayed. If there are a plurality of recommended contents, the contents may be displayed in the order of top to bottom according to recommendation hit ratios or use indices. Afterwards, if a user selects a specific channel 360, the processor 120 may convert to the selected content 370.

FIG. 4 is a diagram displaying a UI inquiring to a user whether to view a specific content on the display 131.

Referring to FIG. 4, the processor 120 may display a screen which enables selection for a user regarding what type of content the user will watch, without specifying a channel. For example, in case there is a history of viewing a content by using a replay function such as a smart TV and an IPTV, but not a program that is currently viewed in a general case, there are few cases wherein a user watches the same content. Accordingly, the processor 120 may display a screen which recommends a similar type of recommended content instead of recommending the same content, and enables movement to a menu wherein contents of the type are collected. Here, in case a content previously viewed consists of a plurality of episodes, the next episode of the content may be recommended.

Specifically, if the time when a user is currently watching TV is 6 p.m. of Saturday, a viewing history of 6 p.m. of last Saturday may be used. If there is history information that a user watched an A movie at 6 p.m. of last Saturday, the processor 120 may display a UI element inquiring to the user whether to watch a movie after a specific event occurred 410. If the user wants to watch a movie, the user may click a button, and the processor 120 may display a menu which enables selection of a movie.

FIG. 5 is a diagram for illustrating various embodiments of the disclosure of selecting a recommended content based on history information.

Referring to FIG. 5, it is assumed that a plurality of contents are broadcast channels, and there is a channel viewing history of from 2017 Jul. 24 to 2017 Jul. 30 in the memory 110. If a specific event (e.g., a user selects a specific button of a remote control) occurs at 20 o'clock of 2017 Aug. 4 (Saturday), a first weight W1 is added to a viewing history corresponding to the times to which 20 o'clock belongs, and a second weight W2 is added to a viewing history corresponding to Saturday, and a third weight W3 is added to a viewing history corresponding to the other days and time zones, and use indices of each of the plurality of broadcast channels are calculated.

Specifically, for the CB # channel, as there is a viewing history of four times on a day and a time different from the day and the time when a specific event occurred, the use index for the CB # channel is 4×W3. Meanwhile, for the FO # channel, as there is a viewing history of one time at the time when a specific event occurred, and a viewing history of one time on the day when a specific event occurred, the use index for the FO # channel is 1×W1+1×W2. Meanwhile, for the ESP # channel, as there is a viewing history of three times at the time when a specific event occurred, and a viewing history of one time on a day and a time different from the day and the time when a specific event occurred, the use index for the ESP # channel is 3×W1+1×W3. Meanwhile, for the TN # channel, as there is a viewing history of two times at the time when a specific event occurred, the use index for the TN # channel is 2×W1. Meanwhile, for the Golf channel, as there is a viewing history of one time on a day and a time different from the day and the time when a specific event occurred, the use index for the Golf channel is 1×W3.

In the aforementioned embodiment, it was explained that a use index is calculated based on the number of times of use (the number of times of viewing). However, according to another embodiment of the disclosure, a use index may be calculated based on the time of use (the time of viewing). The time of use may be calculated while being divided by a unit of one hour. Explaining in this regard with reference to FIG. 5 again, for the CB # channel, as there is a viewing history of from 17 to 18 of Tuesday, from 17 to 18 of Wednesday, from 17 to 18 of Thursday, and 22 to 23 of Friday which do not correspond to the day and the time when a specific event occurred, the use index for the CB # channel is 1 hr×W3+1 hr×W3+1 hr×W3+1 hr×W3. Meanwhile, for the FO # channel, as there is a viewing history of one hour from 19 to 20 of Saturday which is the day when a specific event occurred but not the time when a specific event occurred (1 hr×W2), and a viewing history of one hour from 20 to 21 of Saturday which is the day when a specific event occurred and the time when a specific event occurred (1 hr×(W1+W2)), the use index for the FO # channel is 1 hr×W2+1 hr×(W1+W2). Meanwhile, for the ESP # channel, as there is a viewing history of one hour from 19 to 20 of Monday which does not correspond to the day and the time when a specific event occurred (1 hr×W3), a viewing history of one hour from 20 to 21 of Monday which does not correspond to the day when a specific event occurred but corresponds to the time when a specific event occurred (1 hr×W1), a viewing history of one hour from 21 to 22 of Monday which does not correspond to the day and the time when a specific event occurred (1 hr×W3), a viewing history of one hour from 19 to 20 of Tuesday which does not correspond to the day and the time when a specific event occurred (1 hr×W3), a viewing history of one hour from 20 to 21 of Tuesday which does not correspond to the day when a specific event occurred but corresponds to the time when a specific event occurred (1 hr×W1), a viewing history of one hour from 19 to 20 of Friday which does not correspond to the day and the time when a specific event occurred (1 hr×W3), a viewing history of one hour from 20 to 21 of Friday which does not correspond to the day when a specific event occurred but corresponds to the time when a specific event occurred (1 hr×W1), a viewing history of one hour from 17 to 18 of Sunday which is different from the day and the time when a specific event occurred (1 hr×W3), and a viewing history of one hour from 18 to 19 of Sunday which is different from the day and the time when a specific event occurred (1 hr×W3), the use index for the ESP # channel is 1 hr×W3+1 hr×W1+1 hr×W3+1 hr×W3+1 hr×W1+1 hr×W3+1 hr×W1+1 hr×W3+1 hr×W3. Meanwhile, for the TN # channel, as there is a viewing history of one hour from 19 to 20 of Wednesday which does not correspond to the day and the time when a specific event occurred (1 hr×W3), a viewing history of one hour from 20 to 21 of Wednesday which does not correspond to the day when a specific event occurred but corresponds to the time when a specific event occurred (1 hr×W1), a viewing history of one hour from 19 to 20 of Thursday which does not correspond to the day and the time when a specific event occurred (1 hr×W3), and a viewing history of one hour from 20 to 21 of Thursday which does not correspond to the day when a specific event occurred but corresponds to the time when a specific event occurred (1 hr×W1), the use index for the TN # channel is 1 hr×W3+1 hr×W1+1 hr×W3+1 hr×W1. Meanwhile, for the Golf channel, as there is a viewing history of one hour from 22 to 23 of Monday which is a day and a time different from the day and the time when a specific event occurred (1 hr×W3), and a viewing history of one hour from 22 to 23 of Monday which is a day and a time different from the day and the time when a specific event occurred (1 hr×W3), the use index for the Golf channel is 1 hr×W3+1 hr×W3. Summing up the above, it is as shown in Table 1 below.

TABLE 1

| Channel | Use Index |
|---------|-----------|
| CB# | 1 hr × W3 + 1 hr × W3 + 1 hr × W3 + 1 hr × W3 |
| FO# | 1 hr × W2 + 1 hr × (W1 + W2) |
| ESP# | 1 hr × W3 + 1 hr × W1 + 1 hr × W3 + 1 hr × W3 + 1 hr × W1 + 1 hr × W3 + 1 hr × W1 + 1 hr × W3 + 1 hr × W3 |
| TN# | 1 hr × W3 + 1 hr × W1 + 1 hr × W3 + 1 hr × W1 |
| Golf | 1 hr × W3 + 1 hr × W3 |

Meanwhile, in the aforementioned embodiment, it was explained that a use index is calculated with one hour as one unit. However, according to another embodiment of the disclosure, a use index may be calculated with the time period from a viewing starting time to a viewing finishing time of a specific channel as one unit. Explaining in this regard with reference to FIG. 5 again, for the CB # channel, as there is a viewing history of from 17 to 18 (1 hr) of Tuesday, from 17 to 18 (1 hr) of Wednesday, from 17 to 18 (1 hr) of Thursday, and 22 to 23 (1 hr) of Friday which do not correspond to the day and the time when a specific event occurred, the use index for the CB # channel is 1 hr×W3+1 hr×W3+1 hr×W3+1 hr×W3. Meanwhile, for the FO # channel, as there is a viewing history of two hours from 19 (the viewing starting time) to 21 (the viewing finishing time) of Saturday which is the day when a specific event occurred and which are the times to which 20 o'clock that is the time when a specific event occurred belongs, the use index for the FO # channel is 2 hr×(W1+W2). Meanwhile, for the ESP # channel, as there is a viewing history of seven hours in total from 19 to 22 (3 hr) of Monday, from 19 to 21 (2 hr) of Tuesday, and from 19 to 21 (2 hr) of Friday which are the times wherein a specific event occurred, and a viewing history of two hours from 17 to 19 of Sunday which is a day and a time different from the day and the time when a specific event occurred, the use index for the ESP # channel is 3 hr×W1+2 hr×W1+2 hr×W1+2 hr×W3. Meanwhile, for the TN # channel, as there is a viewing history of from 19 to 21 (2 hr) of Wednesday and a viewing history of from 19 to 21 (2 hr) of Thursday which are the times wherein a specific event occurred, the use index for the TN # channel is 2 hr×W1+2 hr×W1. Meanwhile, for the Golf channel, as there is a viewing history of two hours from 22 to 24 of Monday which is a day and a time different from the day and the time when a specific event occurred, the use index for the Golf channel is 2 hr×W3. Summing up the above, it is as shown in Table 2 below.

TABLE 2

| Channel | Use Index |
|---|---|
| CB# | 1 hr × W3 + 1 hr × W3 + 1 hr × W3 + 1 hr × W3 |
| FO# | 2 hr × (W1 + W2) |
| ESP# | 3 hr × W1 + 2 hr × W1 + 2 hr × W1 + 2 hr × W3 |
| TN# | 2 hr × W1 + 2 hr × W1 |
| Golf | 2 hr × W3 |

Meanwhile, according to another embodiment of the disclosure, a use index may be calculated by applying a reduction value corresponding to the date when a content corresponding to a history was performed. That is, in the aforementioned embodiments, it was explained that a use index was calculated based on 'a use time T×a weight W,' but according to an embodiment wherein a reduction value is applied, a use index is calculated based on 'a reduction value R×a use time T×a weight W.' A reduction value may be set such that a reduction ratio becomes bigger as a date is earlier. For example, a reduction value A may be defined as follows. A reduction value $R=(1-r)^d$.

Here, $0<r<1$, and d is a difference between a date when a content corresponding to a history was performed and a date when an event occurred.

Hereinafter, application of a reduction value to the values calculated in Table 1 will be described. As a representative example, description will be made regarding the CB # channel. If the date when a specific event occurred is 2017 Aug. 4, regarding viewing of CB # from 17 to 18 of 2017 Jul. 25, the difference d between the date 2017 Aug. 4 and the date 2017 Jul. 25 is 11, and accordingly, the use index is calculated as $(1-r)^{11} \times 1$ hr×W3. In the same manner, regarding viewing of CB # from 17 to 18 of 2017 Jul. 26, the use index is calculated as $(1-r)^{10} \times 1$ hr×W3, and regarding viewing of CB # from 17 to 18 of 2017 Jul. 27, the use index is calculated as $(1-r)^9 \times 1$ hr×W3, and regarding viewing of CB # from 22 to 23 of 2017 Jul. 28, the use index is calculated as $(1-r)^8 \times 1$ hr×W3. When calculation is also made for other channels in the same manner, it is as shown in Table 3 below.

TABLE 3

| Channel | Use Index |
|---|---|
| CB# | $(1-r)^{11} \times 1$ hr × W3 + $(1-r)^{10} \times 1$ hr × W3 + $(1-r)^9 \times 1$ hr × W3 + $(1-r)^8 \times 1$ hr × W3 |
| FO# | $(1-r)^7 \times \{1$ hr × W2 + 1 hr × (W1 + W2)$\}$ |
| ESP# | $(1-r)^{12} \times \{1$ hr × W3 + 1 hr × W1 + 1 hr × W3$\}$ + $(1-r)^{11} \times \{1$ hr × W3 + 1 hr × W1$\}$ + $(1-r)^8 \times \{1$ hr × W3 + 1 hr × W1$\}$ + $(1-r)^6 \times \{1$ hr × W3 + 1 hr × W3$\}$ |
| TN# | $(1-r)^{10} \times \{1$ hr × W3 + 1 hr × W1$\}$ + $(1-r)^9 \times \{1$ hr × W3 + 1 hr × W1$\}$ |
| Golf | $(1-r)^{12} \times \{1$ hr × W3 + 1 hr × W3$\}$ |

When a reduction value is applied to the values calculated in Table 2, it is as shown in Table 4 below.

TABLE 4

| Channel | Use Index |
|---|---|
| CB# | $(1-r)^{11} \times 1$ hr × W3 + $(1-r)^{10} \times 1$ hr × W3 + $(1-r)^9 \times 1$ hr × W3 + $(1-r)^8 \times 1$ hr × W3 |
| FO# | $(1-r)^7 \times 2$ hr × (W1 + W2) |
| ESP# | $(1-r)^{12} \times 3$ hr × W1 + $(1-r)^{11} \times 2$ hr × W1 + $(1-r)^8 \times 2$ hr × W1 + $(1-r)^6 \times 2$ hr × W3 |
| TN# | $(1-r)^{10} \times 2$ hr × W1 + $(1-r)^9 \times 2$ hr × W1 |
| Golf | $(1-r)^{12} \times 2$ hr × W3 |

As in the aforementioned embodiment, when the concept of a reduction value is applied, use indices are calculated while the recent use history is reflected in a bigger ratio. Accordingly, there is an advantage that a recommended content which is more appropriate for a user's recent tendency of using contents can be provided. Meanwhile, in the examples explained with reference to FIG. 5, it was described that history information of one week is used. However, the disclosure is not limited thereto, and history information of a recent few days or a recent few weeks may be used, or information on the entire history accumulated from the initial date of using the electronic device 100 may be used. The processor 120 may select a recommended content based on calculated use indices. For example, if the sizes of the use indices are in the order of the ESP # channel>the TN # channel>the FO # channel>the CB # channel>the Golf channel, the processor 120 may select the ESP # channel of which use index is the highest as a recommended content, or select the ESP # channel, the TN # channel, and the FO # channel which are within a predetermined rank (e.g., the third rank) as recommended contents.

Then, the processor 120 may provide information on a selected recommended content through the outputter 130.

The outtputer 130 is a component that can provide information on a recommended content, and for example, it may be implemented as a speaker 132 or a display 131 provided on the electronic device 100.

In case the electronic device is a TV, and a content to be recommended is a broadcast channel, if a specific event occurs (e.g., if a specific button is selected on a remote control device), a UI element which enables selection of at least one channel selected as a recommended channel may be displayed. A user may select a desired channel through the UI element and view the channel. In case there are a plurality of contents selected as recommended contents, the contents may be provided while being aligned in the order of having a bigger use index.

In another way, in the case of selecting a channel by moving a cursor on a UI in the form of a scroll to which broadcast channels are mapped, an indicator (e.g., indication in the form of a star) may be displayed on a part wherein a recommended broadcast channel is located on the UI in the form of a scroll.

The processor 120 of the electronic device 100 may provide a UI in the form of a scroll. To the UI in the form of a scroll, a plurality of channels are mapped, and a channel may be selected by moving the cursor up and down through a remote control device. Specifically, if the cursor moves and stays on a specific location for a specific time period, a channel corresponding to the location may be selected. On the UI in the form of a scroll, an indicator informing the locations wherein channels selected as recommended channels are located may be displayed. A user may select a recommended channel by moving the cursor to the location wherein the indicator is located.

As another method of recommending a broadcast channel, a recommended broadcast channel may be displayed differently from other broadcast channels on an EPG (e.g., displayed in a different color).

Meanwhile, if the electronic device 100 is a smart phone, and a specific event occurs (e.g., if "RECOMMENDED" is touched), a UI element which enables selection of music selected as recommended music may be displayed. A user may select desired music through the UI element and play the music.

In case a content to be recommended is an application, if a specific event occurs (e.g., if a preset time comes), a UI element including an icon corresponding to an application selected as a recommended application may be displayed. A user may select a desired application through the UI element and execute the application. If 'SEE MORE' is selected, applications in the next ranks, i.e., applications of which use indices are the next biggest may be displayed.

Meanwhile, in the above, it was described that recommendation information is provided at the electronic device 100, but it is also possible that recommendation information is provided at an external device of the electronic device 100. For example, in case the electronic device 100 is implemented as a smartphone, the electronic device 100 may provide information on a recommended content to a large screen device such as a TV through wireless communication such as mirroring, DLNA, and Wi-Fi, and thus information on a recommended content may be displayed on a large screen.

According to an embodiment of the disclosure, by applying a pattern analyzer which went through self-verification, a recommended content which is adaptive according to a content use pattern of each user may be provided. Specifically, by determining weights W1, W2, W3 added to a history adaptively according to a content use pattern of a user, a content which is more appropriate for a user's tendency may be recommended. For this, according to an embodiment of the disclosure, a content use pattern index which digitized a user's content use pattern may be used.

A content use pattern index is, for example, digitation of a user's content use pattern such as a user's content use pattern of mainly using contents only in a specific time, a user's content use pattern of mainly using contents only on a specific day, and a user's content use pattern of evenly using contents in all times. The processor 120 may calculate a use pattern index of a content based on history information stored in the memory 110.

A content use pattern index may be set such that the content use pattern index becomes bigger as the degree of being distanced from the average becomes bigger by introducing the concept of dispersion. Accordingly, a user's content use pattern index wherein a content use ratio of a specific day or a specific time is big is bigger than a user's content use pattern index wherein contents are evenly used in all times or on all days.

A content use pattern index may include at least one of a day pattern index or a time pattern index. A day pattern index may be calculated based on use history for each day, and a time pattern index may be calculated based on use history for each time.

Describing an example of a method for calculating a day pattern index, the processor 120 may calculate dispersion for use times for each day with respect to each of a plurality of contents based on history information stored in the memory 110, and calculate a day pattern index based on the calculated dispersion. For example, in case first to third contents were used according to history information, the processor 120 may calculate dispersion for use times for each day with respect to the first content, calculate dispersion for use times for each day with respect to the second content, and calculate dispersion for use times for each day with respect to the third content. The sum of multiplications of the use ratios of contents with respect to the first to third contents with each calculated dispersion becomes a day pattern index.

Describing an example of a method for calculating a time pattern index, the processor 120 may calculate dispersion for use times for each time with respect to each of a plurality of contents based on history information stored in the memory 110, and calculate a time pattern index based on the calculated dispersion. For example, in case first to third contents were used according to history information, the processor 120 may calculate dispersion for use times for each time with respect to the first content, calculate dispersion for use times for each time with respect to the second content, and calculate dispersion for use times for each time with respect to the third content. The sum of multiplications of the use ratios of contents with respect to the first to third contents with each calculated dispersion becomes a time pattern index.

Meanwhile, a use history which becomes a basis for calculating a content use pattern index may be, for example, a use history of a recent few weeks or days, or the entire use history. For calculation of a content use pattern index, a history of use shorter than a predetermined time period (e.g., ten minutes) may be ignored.

The processor 120 may determine weights based on content use pattern indices for a plurality of contents. For example, information on different weights for each content use pattern index may be stored in advance in the memory 110, and the processor 120 may select a weight corresponding to the currently calculated content use pattern index from the pre-stored information on weights.

As a content use pattern index is calculated based on history information, if history information is updated according to use of the electronic device 100, a content use pattern index is re-calculated based on the updated history information, and a weight is also updated based on the re-calculated content use pattern index. Update may be performed for every predetermined period.

As described above, according to the disclosure, there is an advantage that a weight adaptively changes according to change of a viewing history, and thus a content that suits a user's recent content use pattern can be recommended. Also, there is an advantage that recommendation can be performed in real time on the electronic device 100 (on-device real—time), but not based on a server.

According to another embodiment of the disclosure, based on which characteristic a user's content use pattern of the electronic device 100 has relatively in comparison with a user's content use pattern of other electronic devices, a weight that suits the characteristic may be determined. For this, by clustering content use pattern indices calculated from the electronic device 100 as described above and content use pattern indices calculated at other electronic devices, a weight corresponding to the cluster to which the content use pattern indices calculated at the electronic device 100 belong may be selected. An operation of clustering content use pattern indices may be performed at an external server.

Meanwhile, the electronic device 100 and other electronic devices may transmit content use pattern indices to a server, and the server may apply an artificial intelligence technology to collected data and figure out which characteristic a user's content use pattern of each electronic device has. It is preferable that other electronic devices are devices having high relevance to the electronic device. This is because it can be advantageous to compare users' content use patterns of devices having relevance to one another in deriving a meaningful result. Thus, according to an embodiment of the disclosure, other electronic devices may be within the same area as the electronic device. For example, the electronic device and other electronic devices may be TVs used in homes in a specific city.

An artificial intelligence technology consists of a machine learning (deep learning) technology using an algorithm which classifies/learns the characteristics of input data by itself, and element technologies of simulating functions of a human brain such as cognition and determination by using a machine learning algorithm. By using a knowledge representation technology of processing information of human experiences into knowledge data among such element technologies, the server may cluster content use patterns of each electronic device. Knowledge representation is a technology of automatically processing information of human experiences into knowledge data, and includes knowledge construction (data generation/classification), knowledge management (data utilization), and the like.

As an example, the server may cluster content use pattern indices based on a value of standard deviation 6 of collected content use pattern indices into bundles in an N number, and classify them.

Also, as an example, the server may classify collected time pattern indices into a cluster of weak time patterns (a time pattern index<$0.5\sigma$), a cluster of intermediate time patterns ($0.5\sigma \leq$ a time pattern index<$\sigma$), and a cluster of strong time patterns (a time pattern index>$\sigma$). In addition, the server may classify collected day pattern indices into a cluster of weak day patterns (a day pattern index<$0.5\sigma$), a cluster of intermediate day patterns ($0.5\sigma \leq$ a day pattern index<$\sigma$), and a cluster of strong day patterns (a day pattern index>$\sigma$). By combination of three time pattern clusters and three day pattern clusters clustered as above, nine groups may be defined. Also, the first weight W1, the second weight W2, and the third weight W3 may be set to suit the characteristics of each of the nine groups. A weight is set such that a stronger pattern has a bigger value. In other words, if a content use pattern of a user has high dependency on time, a time weight is set to be high, and if a content use pattern of a user has high dependency on days, a day weight is set to be high.

The server transmits information on weights corresponding to groups to which each of the electronic device 100 and other electronic devices belongs to the electronic device 100. For example, if the group to which the electronic device 100 belongs is 'a weak day pattern & a strong time pattern group,' weight information that the server transmits includes a content informing that W1=30, W2=5, W3=1. Alternatively, in the information that the server transmits to the electronic device 100, only a content informing that the group to which the electronic device 100 belongs is 'a weak day pattern & a strong time pattern group' may be included, and the electronic device 100 may determine the weights as W1=30, W2=5, W3=1 based on information received from the server and information on weights for each group stored in the electronic device 100 in advance.

As described above, according to the disclosure, a model selecting a recommended content based on history information and weights may be implemented in the electronic device 100, and the server may derive a parameter for grouping by utilizing a large amount of data and the model of the electronic device 100 may be updated based on this value. Accordingly, a recommended content may be selected by reflecting a content use pattern that can continuously change with utilization of minimum resources.

Also, in the aforementioned embodiment, it was described that the same weight is applied to contents that belong to the same group, but it is also possible that different weights are applied to contents that belong to the same group based on their relative locations in the group.

Meanwhile, all or some of the operations described to be performed at the server can also be performed at the electronic device 100. For example, the electronic device 100 may receive information on content use pattern indices from other electronic devices and perform clustering as in the aforementioned method, and a weight may be determined based on information on a weight corresponding to the cluster to which the electronic device 100 belongs.

Also, it is possible that some of the operations performed at the electronic device 100 are performed at the server. For example, it is possible that the electronic device 100 provides history information to the server, and the server calculates a content use pattern index. Also, it is possible that the server calculates a use index and selects a recommended content and provides information in this regard to the electronic device 100. That is, it is possible that main operations are made to be performed at the server, and the electronic device 100 is made to just take charge of an outputting function of information. Meanwhile, as history information is personal information, it is preferable that the information is not leaked to the outside. Thus, a method wherein the electronic device 100 transmits a content use pattern index acquired by processing history information to the server, instead of history information, may be preferred.

Meanwhile, a recommended content which has high possibility of being used may be provided not based on history information stored in the electronic device 100, but based on history information of other electronic devices. For example, a server may receive history information from at least one of other electronic devices, and calculate a content use pattern index and a content use index as described above based on the received history information and select a recommended content, and provide information on the selected recommended content to the electronic device. Alternatively, the electronic device 100 may directly receive history information from at least one of other electronic devices not via the server, and calculate a content use pattern index and a content use index as described above based on the received history information and select a recommended content. According to the embodiments of the disclosure, a content that a user of another electronic device prefers may be provided at the electronic device 100.

FIG. 6 is a diagram for illustrating a method for calculating a recommendation hit ratio based on a recommended content.

Referring to FIG. 6, regarding prediction #1, information on a channel, etc. may be included. Also, a channel and the time when a user viewed the channel may be displayed together in the lower part. In case a user views the channel, the processor 120 may increase the count values for the channel as much as +1. For example, if a user selected channel number 5 in a list of recommended contents as in FIG. 6, the processor 120 may add a value of +1 regarding the channel number 5. Also, the processor 120 may compare count values like (1/0/0/0/0/0). In this regard, if the user views channel number 5 again at the same time the next week, the processor 120 may increase the count values like (2/0/0/0/0/0). Meanwhile, if the user views channel number 3 at the same time the next week, the processor 120 may increase the count values like (2/1/0/0/0/0).

In this case, the order of channels may be changed according to the use ratio of a recommended content or a recommendation hit ratio, although the channels are displayed in an arrangement for promoting understanding. Also, the number by which the count values increase may be another number which is not 1, and the method may be a different method other than an addition method.

After count values are acquired, frequency of each count value may be acquired. That is, a recommendation hit ratio may be calculated in consideration of selection frequency. For example, in the case of (2/1/0/0/0/0), channel number 5 may be calculated as a recommendation hit ratio of 66%. The calculated recommendation hit ratios for each channel may be stored in the memory 110. In this case, recommendation hit ratios may be calculated for each channel and the recommendation hit ratios may be divided in more detail in consideration of days and times, and stored in the memory 110.

Meanwhile, in a method wherein the processor 120 provides a recommended content, only a use index may be considered, or a use index and a recommendation hit ratio may be applied simultaneously.

Figure 7:
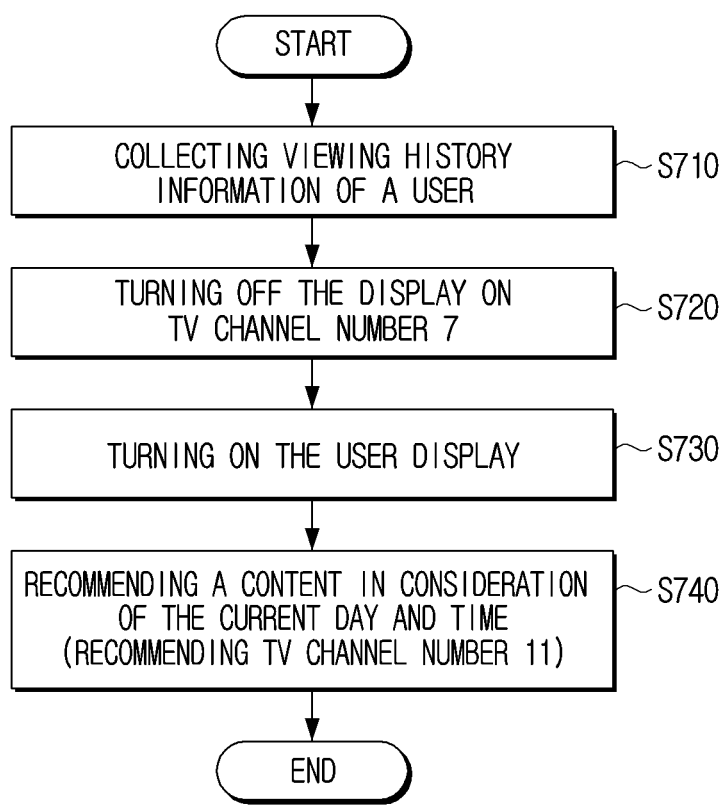
FIG. 7 is a flow chart for illustrating a method for recommending a content according to an embodiment of the disclosure.
Figure 8:
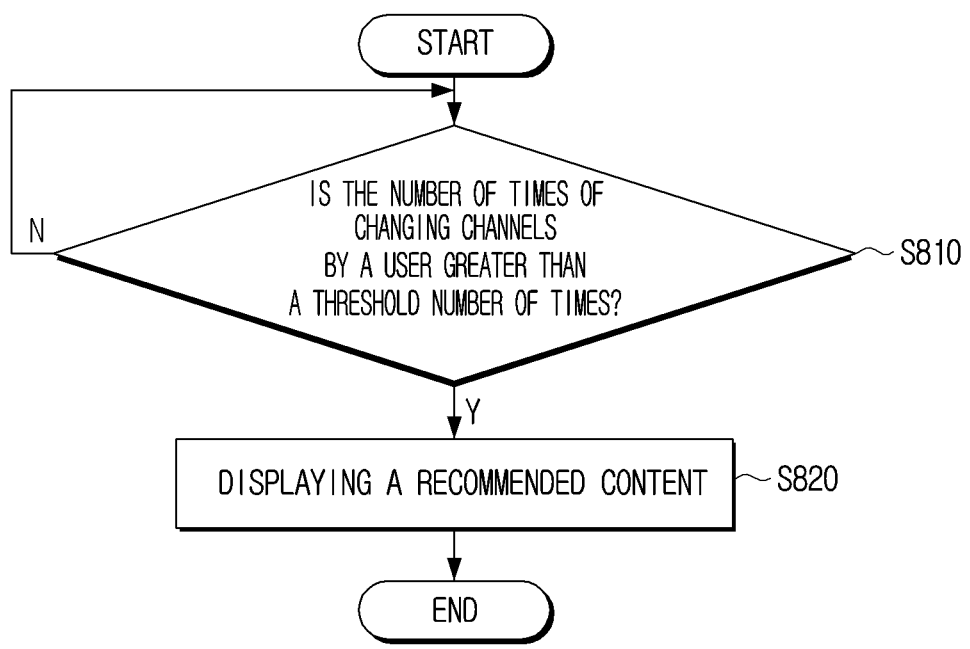
FIG. 8 is a flow chart for illustrating a method for recommending a content according to an embodiment of the disclosure.
Figure 9:
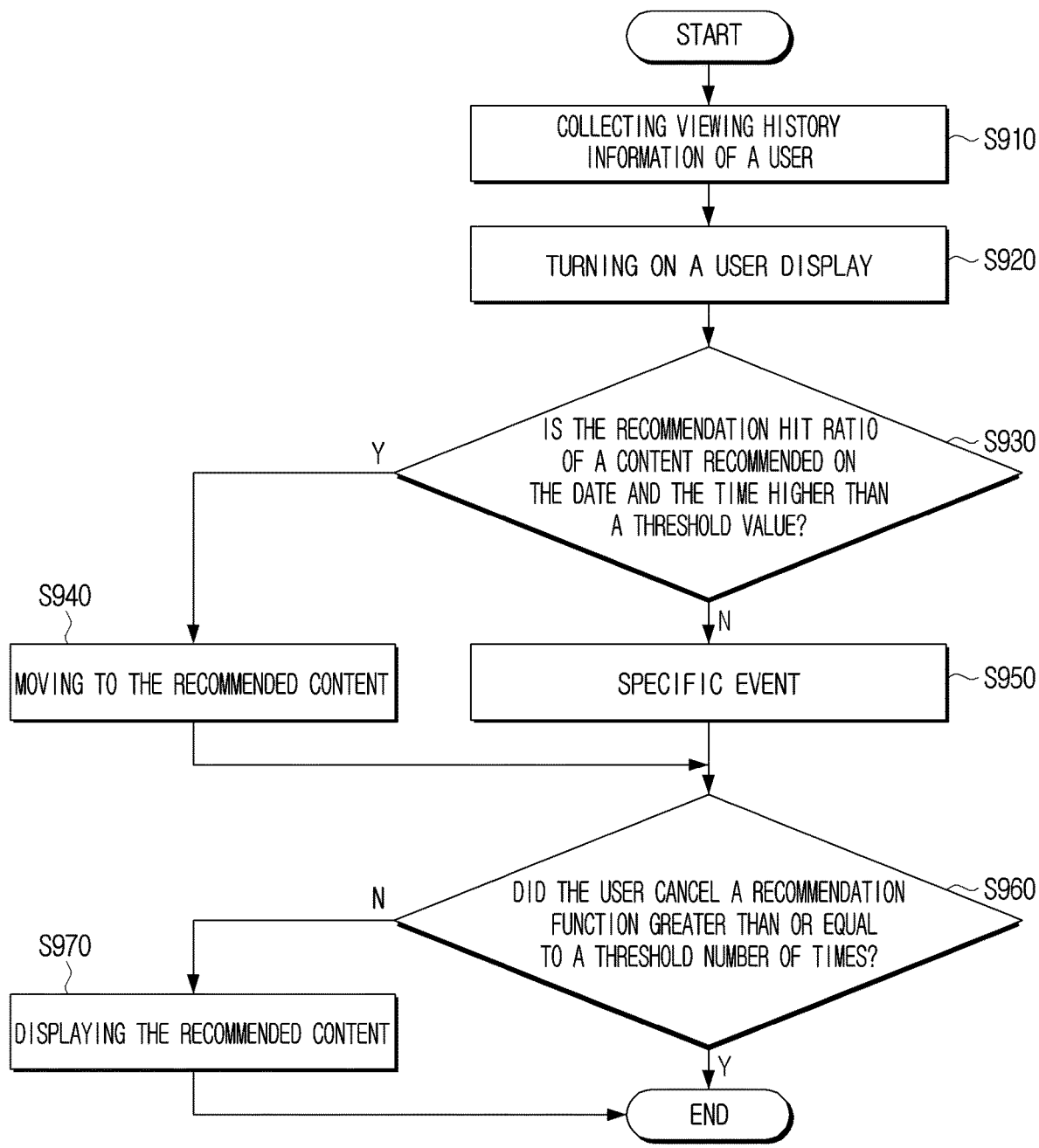
FIG. 9 is a flow chart for illustrating a method for recommending a content according to an embodiment of the disclosure.

FIGS. 7 to 9 are flow charts for illustrating a method for recommending a content according to an embodiment of the disclosure.

FIG. 7 is a diagram for illustrating a method for recommending a content in case the power of a display is turned off and is then turned on.

Referring to FIG. 7, viewing history information on a content that a user views may be collected at operation S710. If a user was viewing channel number 7 when turning off the display 131 of the power device at operation S720, information on the recent viewing history may be stored in the memory 110. Afterwards, if the user turns on the display 131 of the power device at operation S730, it is general that the channel number 7 is displayed. However, by using the day and the time when the display 131 of the power device was turned on, previous user history information may be collected and a recommended content may be provided at operation S740. A method for providing a recommended content may be displaying a list of a plurality of contents or moving directly to a channel corresponding to the recommended content. For example, use indices may be calculated for each selected recommended content in the list by using previous user history information. Here, if the use index of channel number 11 is the highest, control may be performed such that the channel number 11 is displayed immediately when a user turns on the display 131.

Here, an operation of turning on or off the display may mean that a user changes the mode of the electronic device 100 from a power saving mode to a normal mode or from a normal mode to a power saving mode. A power saving mode may mean a state wherein the electronic device is connected to a consent but an image is not displayed on the display panel.

Meanwhile, a channel of which use index is the highest may be displayed immediately, but a recommendation hit ratio may be additionally calculated and control may be performed such that channel number 11 is displayed only when the recommendation hit ratio is greater than or equal to a threshold value, and if the recommendation hit ratio is smaller than a threshold value, control may be performed such that channel number 7 that a user was recently viewing when the display 131 of the electronic device 100 was turned off is displayed.

The number of times of changing channels by a user may be determined as one of specific events. Setting may be made such that, if the number of times of changing channels by a user during a specific time period is greater than or equal to a predetermined number of times of changing channels, it falls under a specific event. For example, a user may store a threshold number of times as ten in the memory 110, etc. in advance. In this case, if the number of times that the user changed channels during a specific time period becomes ten, a recommended content may be displayed to the user. Displaying a recommended content may mean displaying a UI element inquiring to the user whether to select a recommended content, and in case there are a plurality of recommended contents, it may mean displaying a list and displaying a UI element such as a menu.

Referring to FIG. 7, an operation wherein a user turns on the display at operation S730 is described, but this may merely be one operation among specific events. In FIG. 8, an operation in case the number of times of changing channels is greater than a threshold number of times which is another embodiment of a specific event will be described.

FIG. 8 is a flow chart for illustrating a method for recommending a content in consideration of a specific behavior of a user.

Referring to FIG. 8, it may be determined whether a user's number of times of changing channels is greater than a threshold number of times at operation S810. In case a user's number of times of changing channels is greater than a threshold number of times, a recommended content may be displayed at operation S820. Meanwhile, in case a user's number of times of changing channels is smaller than a threshold number of times, the electronic device may not operate until another specific event occurs.

FIG. 9 is a flow chart for illustrating a method for recommending a content in consideration of a recommendation hit ratio and whether a user cancels a recommendation function.

Meanwhile, referring to FIG. 9 which is another embodiment of the disclosure, history information of a user may be collected and stored in the memory 110, etc. at operation S910. Then, when the user turns on the display 131 at operation S920, it may be recognized as one of specific events, and contents for the date and the time may be selected. Also, use indices and recommendation hit ratios of each content recommended on the date and the time among a plurality of selected contents may be calculated.

In this case, it may be determined whether the recommendation hit ratio of a content recommended (selected) on the current date and time is higher than a threshold value at operation S930. Also, control may be performed such that, in case a recommendation hit ratio of a content among a plurality of contents is higher than a threshold value, the channel may be moved directly to that recommended content at operation S940, and in case a recommendation hit ratio of a content is lower than a threshold value, the electronic device may wait until the next specific event occurs.

Afterwards, if a specific event occurs at operation S950, it may be determined whether the number of times that a user of the recommended content is greater than or equal to a threshold number of times at operation S960. The number of times of cancellation means that, even though the electronic device 100 provided a recommended content for the user's convenience, but the user did not accept it and did not select the recommended content, and also, it may mean that the user cancels provision of the recommended content. In case a user cancelled a recommendation function greater than or equal to a threshold number of times, a recommendation function may not be provided, and in case a user cancelled a recommendation function smaller than a threshold number of times or a user did not cancel a recommendation function, the recommended content may be displayed at operation S970. In this case, displaying the recommended content may mean displaying a UI element inquiring to the user whether to select the recommended content, and in case there are a plurality of recommended contents, it may mean displaying a list and displaying a UI element such as a menu.

Figure 10:
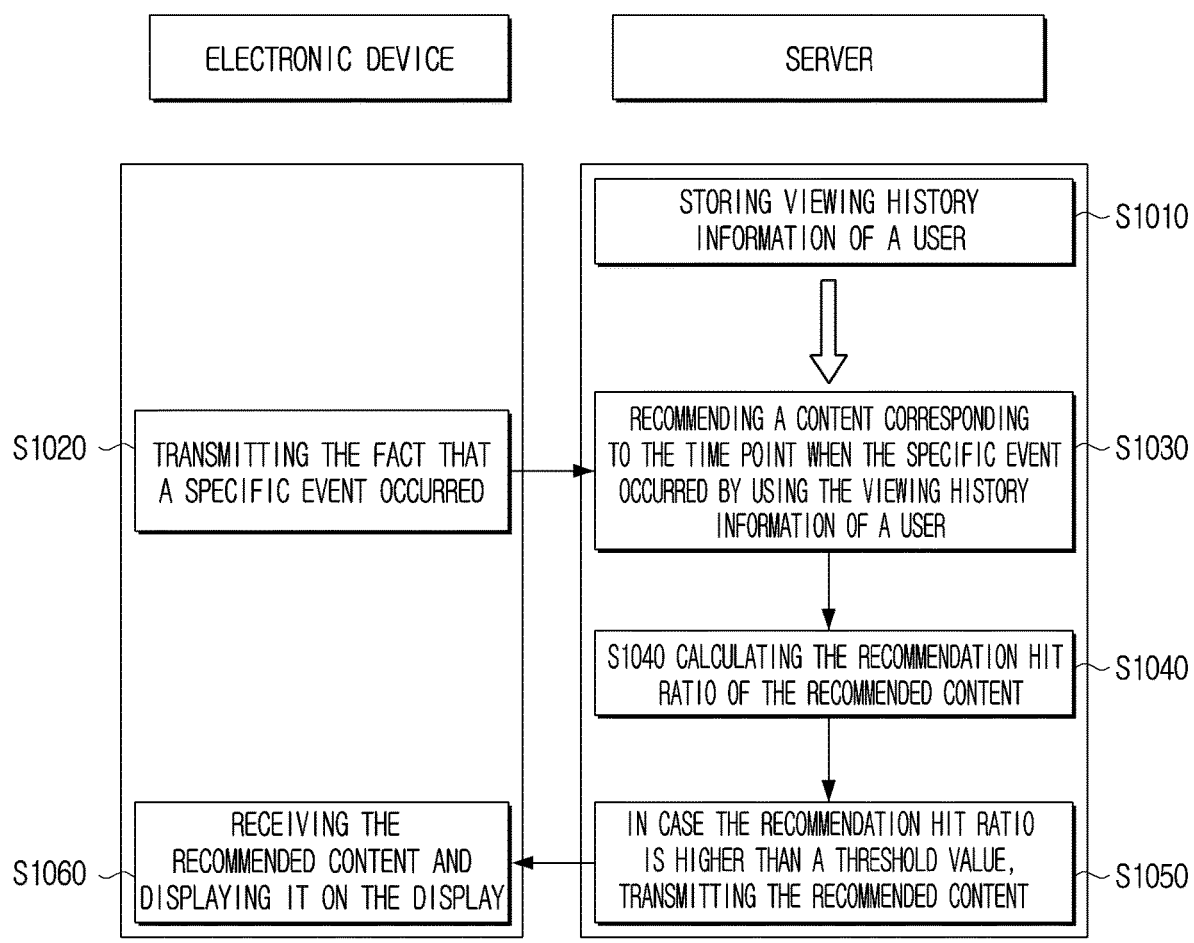
FIG. 10 is a flow chart for illustrating a method for recommending a content according to another embodiment of the disclosure.

FIG. 10 is a flow chart for illustrating a method for recommending a content according to another embodiment of the disclosure.

Referring to FIG. 10, it is described that a process of collecting user history information and storing it in the memory 110 is performed at the electronic device 100, but the same process may be performed at the server. The server may store viewing history information of a user at operation S1010.

The electronic device 100 may transmit the fact that a specific event occurred to the server at operation S1020. In this case, the server may recommend a content corresponding to the time point when the specific event occurred by using the viewing history information of the user at operation S1030. In this case, the meaning of recommendation does not mean an active operation of displaying a content on the display 131 for a user, but may mean an operation of making a list of contents for recommending a content to a user.

The server may calculate the recommendation hit ratio of the recommended content at operation S1040. Afterwards, in case the recommendation hit ratio is higher than a threshold value, the recommended content may be transmitted to the electronic device 100 at operation S1050. In this case, the electronic device 100 may receive the recommended content transmitted from the server and display the content on the display 131. In this case, displaying the recommended content may mean displaying a UI element inquiring to the user whether to select the recommended content, and in case there are a plurality of recommended contents, it may mean displaying a list and displaying a UI element such as a menu.

Figure 11:
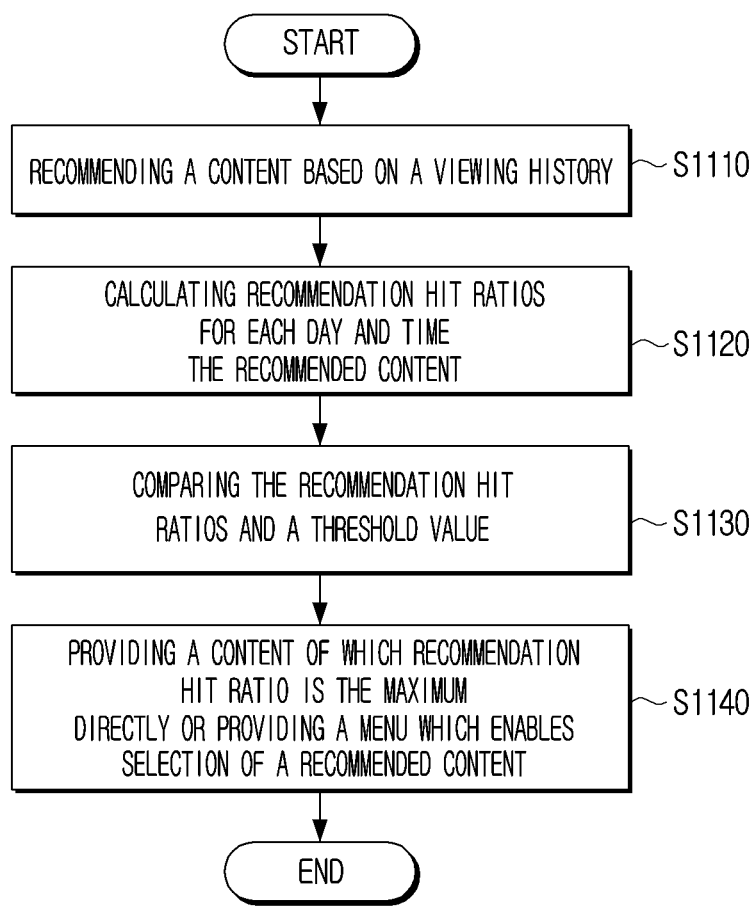
FIG. 11 is a flow chart for illustrating a method for recommending a content by an electronic device according to an embodiment of the disclosure.

FIG. 11 is a flow chart for illustrating a method for recommending a content by the electronic device 100 according to an embodiment of the disclosure.

Referring to FIG. 11, the step of recommending a content based on a viewing history S1110, and the step of calculating recommendation hit ratios for each day and time according to the selection frequency of the recommended content S1120 and storing the recommendation hit ratios may be included.

Here, a method for recommending a content by the electronic device 100 may include the step of, based on a specific event occurring, comparing a recommendation hit ratio corresponding to the day and the time when the specific event occurred and a threshold value S1130. The specific event may be an event wherein the number of times of changing broadcast channels during a predetermined time period exceeds a threshold number of times, or an event wherein a tuned state of a broadcast channel is maintained exceeding a predetermined time period, or an event wherein a viewing starting time or a viewing finishing time predicted on the basis of the viewing history comes.

Also, the step of recommending a content based on a viewing history may include the steps of applying a first weight to the day of viewing a content provided at the electronic device 100 earlier, and applying a second weight to the time of viewing and recommending a content based on a result of combination of the first weight and the second weight.

Here, in the step of calculating hit ratios and storing the same, cases wherein a user actually views the recommended content may be counted, and a ratio between counted contents may be stored as a hit ratio in the memory 110.

Here, the method for recommending a content by the electronic device 100 may include the step of, based on a recommendation hit ratio being higher than a threshold value, directly displaying a content of which recommendation hit ratio is the maximum among contents recommended when the event occurred, and based on a recommendation hit ratio being lower than a threshold value, providing a menu which enables selection of a content recommended when the event occurred S1140.

Meanwhile, the method for recommending a content by the electronic device 100 may include the steps of, based on cancellation of a menu being repeated greater than or equal to a threshold number of times, inactivating a content recommendation function, and based on viewing of the content of which recommendation hit ratio is the maximum being cancelled greater than or equal to a threshold number of times, inactivating a content recommendation function.

In the method for recommending a content by the electronic device 100 according to an embodiment of the disclosure, a weight may be added according to a day and a time in a viewing history and a history index may be calculated, or a recommendation hit ratio may be additionally calculated. Determination according to a day and a time is based on the feature that a user's content consumption pattern is repeated by a unit of a week, and this may be one month or one day, but not one week, according to a user's habit. If different weights are added according to days and times, a content that a user consumes on a specific day at a specific time can be analyzed precisely, and weights may be adjusted appropriately for a user. Also, if a reduction value is used, a content can be recommended mainly based on contents that a user recently consumed, and thus a user's changing consumption pattern can be reflected.

In addition, through a process of calculating a recommendation hit ratio, it may be identified whether a recommended content is appropriate for a user, and values that a user can set in advance such as a weight and a threshold value may be changed by reflecting this. Through the operation of changing a weight, a threshold value, etc., a content that is more appropriate for a user can be recommended. Also, in the method for recommending a content by the electronic device 100 according to an embodiment of the disclosure, a user's pattern that did not use a recommendation function may be analyzed. By reflecting a user's intention by counting the number of times of not using a recommendation function, a consumer's satisfaction can be heightened.

Also, in the method for recommending a content by the electronic device 100 according to an embodiment of the disclosure, an operation of converting (displaying) a content directly under a specific condition, etc. may be performed, and thus a user can access a content that he wishes to view easily, without a separate access to a menu.

In addition, the aforementioned method for recommending a content by the electronic device 100 may be implemented as at least one execution program for executing the aforementioned control method, and such an execution program may be stored in a non-transitory readable medium.

A non-transitory readable medium means a medium that stores data semi-permanently, and is readable by machines, but not a medium that stores data for a short moment such as a register, a cache, and a memory. Specifically, the aforementioned various applications or programs may be provided while being stored in a non-transitory readable medium such as a CD, a DVD, a hard disk, a blue-ray disk, a USB, a memory card, a ROM and the like.

Meanwhile, even though it was described that all components constituting the embodiments of the disclosure are combined as one or operate in combination, the disclosure is not necessarily limited to these embodiments. That is, within the range of the purpose of the disclosure, all of the components may be selectively combined as at least one combination, and operate. Also, even though all of the components may respectively be implemented as independent hardware, some or all of each component may be selectively combined and implemented as a computer program having a program module performing some or all functions combined in one or a plurality of hardware. The codes and code segments constituting the computer program may be easily inferred by those skilled in the art to which the disclosure belongs. Such a computer program may implement the embodiments of the disclosure by being stored in a non-transitory computer readable medium and read and executed by a computer.

Here, a non-transitory readable medium means a medium that stores data semi-permanently, and is readable by machines, but not a medium that stores data for a short moment such as a register, a cache, and a memory. Specifically, the aforementioned programs may be provided while being stored in a non-transitory readable medium such as a CD, a DVD, a hard disk, a blue-ray disk, a USB, a memory card, a ROM and the like.

While preferred embodiments of the disclosure have been shown and describ ed, the disclosure is not limited to the aforementioned specific embodiments, and it is apparen t that various modifications can be made by those having ordinary skill in the art to which the disclosure belongs, without departing from the gist of the disclosure as claimed by the appen ded claims, and such modifications are within the scope of the descriptions of the claims.

What is claimed is:

1. A method for recommending a content by an electronic device, the method comprising:
   providing a content on the basis of a viewing history;
   obtaining recommendation hit ratios of the content according to days of the week and times of the day on the basis of a user selection frequency of the content, and storing the obtained recommendation hit ratios of the content;
   in response to a specific event occurring, identifying a recommendation hit ratio of the content corresponding to the day and time when the specific event occurred based on the obtained recommendation hit ratios of the content;
   based on the identified recommendation hit ratio being equal to or greater than a threshold value, directly providing the content corresponding to the day and time when the specific event occurred; and
   based on the recommendation hit ratio being lower than the threshold value, providing a menu which enables selection of the content corresponding to the day and time when the specific event occurred.

2. The method for recommending a content by an electronic device of claim 1, the method further comprising:
   based on a cancellation of the menu being repeated greater than or equal to a threshold number of times, inactivating a content recommendation function.

3. The method for recommending a content by an electronic device of claim 1, the method further comprising:
   based on viewing of the content directly provided as the recommendation hit ratio is higher than a threshold value being cancelled greater than or equal to a threshold number of times, inactivating a content recommendation function.

4. The method for recommending a content by an electronic device of claim 1,
   wherein the specific event is an event wherein the number of times of changing broadcast channels during a predetermined time period exceeds a threshold number of times.

5. The method for recommending a content by an electronic device of claim 1,
   wherein the specific event is an event wherein a tuned state of a broadcast channel is maintained exceeding a predetermined time period.

6. The method for recommending a content by an electronic device of claim 1,
   wherein the specific event is an event wherein a viewing starting time or a viewing finishing time predicted on the basis of the viewing history occurs.

7. The method for recommending a content by an electronic device of claim 1, wherein the providing a content on the basis of a viewing history comprises:
   applying a first weight to the day of viewing a content provided at the electronic device earlier, and applying a second weight to the time of viewing; and
   providing a content based on a result of a combination of the first weight and the second weight.

8. The method for recommending a content by an electronic device of claim 1, wherein the obtaining hit ratios and storing the same comprises:
   counting cases wherein a user actually views the provided content, and storing a ratio between counted contents as a hit ratio in a memory.

9. An electronic device comprising:
   a display;
   a memory storing a viewing history; and
   a processor configured to:
      provide a content on the basis of a viewing history;
      obtain recommendation hit ratios of the content according to days of the week and times of the day on the basis of a user selection frequency of the content, and storing the obtained recommendation hit ratios of the content;
   wherein the processor further configured to:
      in response to a specific event occurring, identify a recommendation hit ratio of the content corresponding to the day and time when the specific event occurred based on the obtained recommendation hit ratios of the content;

based on the identified recommendation hit ratio being equal to or greater than a threshold value, directly provide the content corresponding to the day and time when the specific event occurred, and based on the recommendation hit ratio being lower than the threshold value, provide a menu which enables selection of the content corresponding to the day and time when the specific event occurred.

10. The electronic device of claim 9,
wherein the processor is configured to:
based on cancellation of the menu being repeated greater than or equal to a threshold number of times, inactivate a content recommendation function.

11. The electronic device of claim 9,
wherein the processor is configured to:
based on viewing of the content directly provided as the recommendation hit ratio is higher than a threshold value being cancelled greater than or equal to a threshold number of times, inactivate a content recommendation function.

12. The electronic device of claim 9,
wherein the specific event is an event wherein the number of times of changing broadcast channels during a predetermined time period exceeds a threshold number of times.

13. A non-transitory computer readable recording medium including a program for executing a method for recommending a content by an electronic device, wherein the recommendation method comprises:

providing a content on the basis of a viewing history;

obtaining recommendation hit ratios of the content according to days of the week and times of the day on the basis of a user selection frequency of the content, and storing the obtained recommendation hit ratios of the content;

in response to a specific event occurring, identifying a recommendation hit ratio of the content corresponding to the day and time when the specific event occurred based on the obtained recommendation hit ratios of the content;

based on the identified recommendation hit ratio being equal to or greater than a threshold value, directly providing the content corresponding to the day and time when the specific event occurred; and based on the recommendation hit ratio being lower than the threshold value, providing a menu which enables selection of the content corresponding to the day and time when the specific event occurred.

* * * * *